United States Patent [19]

Daugherty

[11] Patent Number: 5,544,574
[45] Date of Patent: Aug. 13, 1996

[54] PECAN SHUCKER

[76] Inventor: Joe D. Daugherty, 402 E. Blodgett, Carlsbad, N.M. 88220

[21] Appl. No.: 408,232

[22] Filed: Mar. 22, 1995

[51] Int. Cl.$^6$ ........................................ A23N 5/08
[52] U.S. Cl. ................. 99/572; 99/577; 99/582; 426/482
[58] Field of Search .................. 83/856, 870, 932; 99/537, 572, 574, 577, 579, 582, 583; 426/482

[56] References Cited

U.S. PATENT DOCUMENTS

| | | |
|---|---|---|
| 652,104 | 7/1895 | Prade . |
| 751,377 | 2/1904 | Carr . |
| 998,428 | 7/1911 | Elder . |
| 1,149,194 | 8/1915 | Grimm . |
| 1,232,409 | 7/1917 | Alcayde . |
| 1,474,468 | 11/1923 | Fogarty . |
| 1,609,352 | 12/1926 | Giesecke et al. . |
| 2,212,213 | 8/1940 | Rothenberger et al. ............... 146/10 |
| 2,344,711 | 3/1944 | McNutt et al. ........................ 146/10 |
| 3,048,208 | 8/1962 | Umanoff ............................... 146/13 |
| 4,073,032 | 2/1978 | Packwood ............................ 99/574 |

OTHER PUBLICATIONS

Italian Patent No. 660,392 Issued Feb. 14, 1964.

Primary Examiner—David Scherbel
Assistant Examiner—Terrence R. Till
Attorney, Agent, or Firm—Marcus L. Bates

[57] ABSTRACT

This invention is to an improved pecan shucker apparatus for shucking pecans, and particularly for obtaining pecan meat halves that are intact and easily freed of the undesirable parts of the pecan, such as the pecan shell and other inedible parts of the pecan. The pecan shucker is suitably supported and has attached thereto a reciprocating actuator for moving a pecan along a longitudinally disposed axis of the apparatus. A plurality of circumferentially arranged roller assemblies are arranged for the rollers thereof to be radially moved towards one another and into engagement with the outer surface of a pecan nut which may be placed therebetween, while exerting a compressive force on the pecan shell of a magnitude to crush the shell at selected areas thereof. Consequently, after the pecan shell is crushed, and the blade passed lengthwise between the halves, the pecan meat halves are shucked from the broken shell and emerge undamaged and are easily freed of debris.

20 Claims, 3 Drawing Sheets

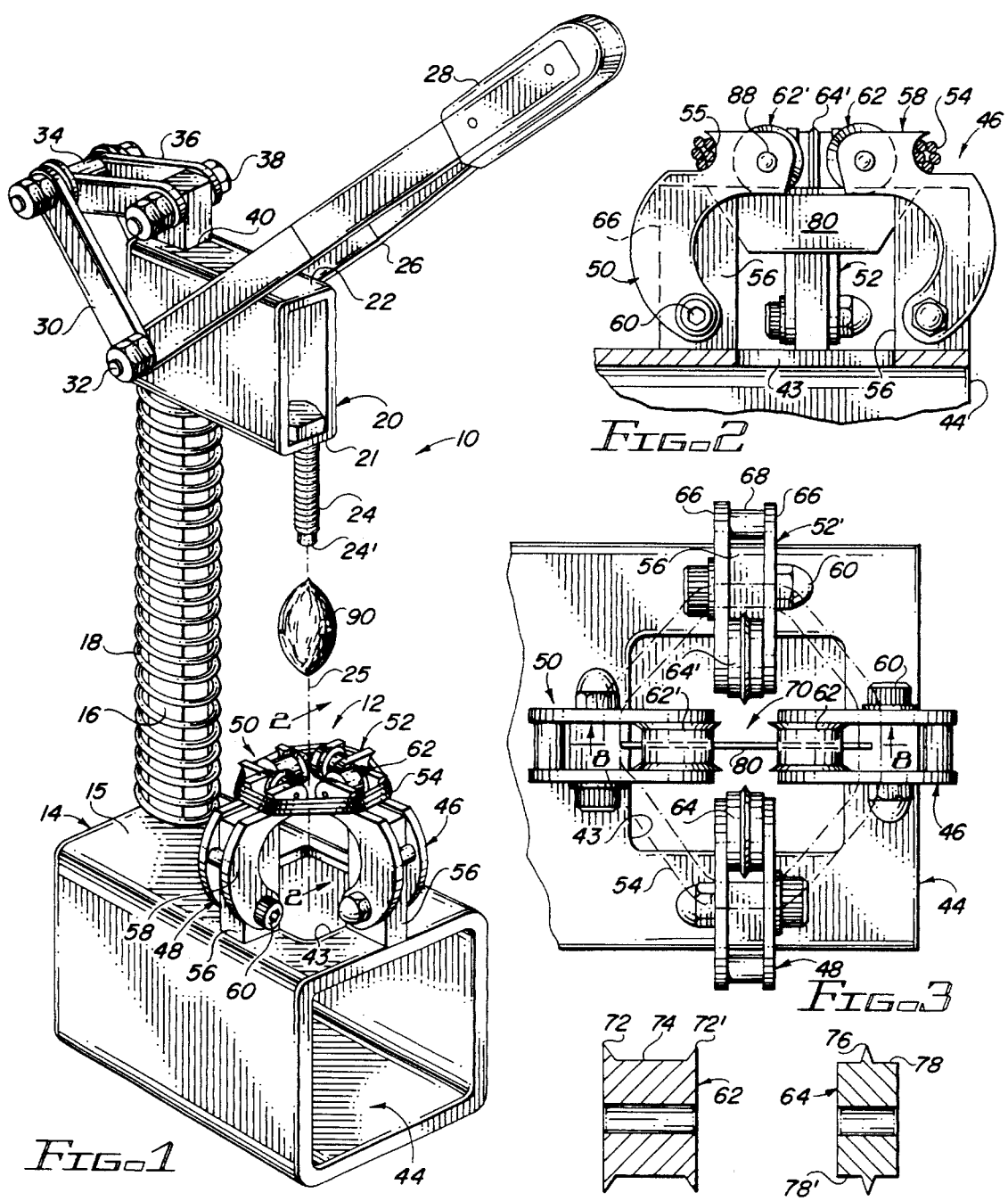

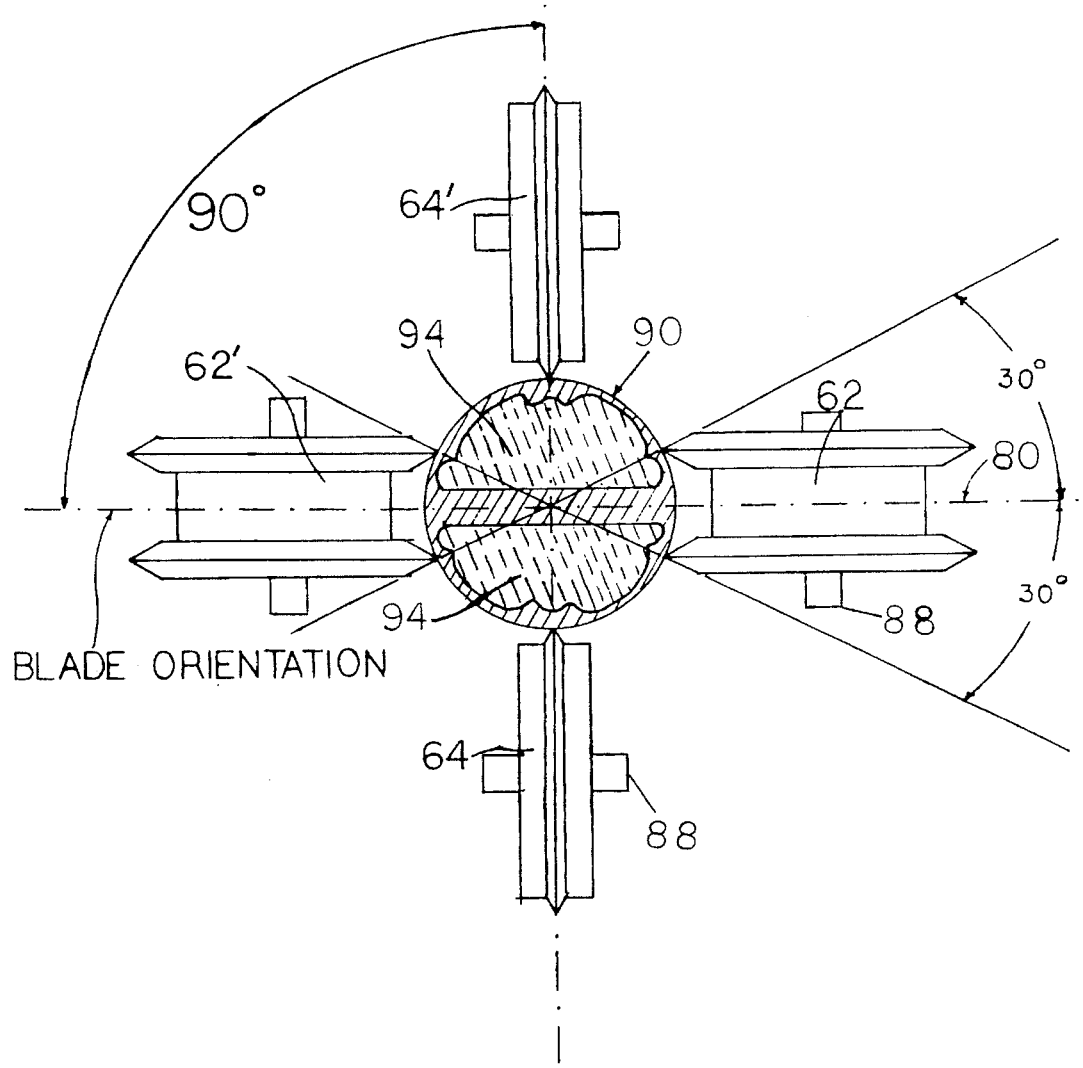

5,544,574

PECAN SHUCKER

BACKGROUND OF THE INVENTION

Throughout this disclosure, the term "pecan" is intended to define a nut, such as the pecan nut, as well as other nuts that may be found compatible for use with the present invention. A pecan half is intended to indicate one of the halves of the entire nut meat that has been separated at the top of the pecan meat where the two halves are joined. Pecan halves fetch a superior price because they are valuable for decorative uses and therefore cost more as compared to broken pecan meats. Besides all this, pecan halves just seem to taste better than an equal serving of bits and pieces of the pecan meat.

Further, the term "debris" defines the unwanted shell fragments and pithy wood that insulates the shell from the meat halves, and everything else other than the pecan meat halves.

All pecans are oblate in cross-sectional configuration, with the pecan halves or pecan meats being oriented lengthwise and the width of the halves extend along the greater dimension of the nut when viewed from the top. Consequently, it has been discovered that when the pecan shell is crushed such that it is cracked in a particular manner, and a blade is thereafter passed lengthwise between the confronting pecan halves, the unobvious result is that the pecan meat halves will almost always emerge undamaged, and are easily cleaned of any loosly attached debris. Hence the term "crush", as used herein, generally is distinguished from the term "cracked" in that the pecan shell herein has opposed compressive forces applied laterally thereto and along opposed longitudinally extending isolated areas thereof. This creates numerous small failures or cracks at opposed predetermined areas of the pecan shell that does not injure or mangle the pecan meats, otherwise the crushing operation becomes instead a cracking operation, and whole pecan meats cannot be gained from the endeavor.

There are numerous pecan crackers, or shellers, or crushers available from the prior art. Some of these pecan shellers strike the opposed ends of the pecan with an impact force that shatters the shell, leaving the pecan nut partially shelled but with the halves and much of the debris left to be removed therefrom. Most of the prior art pecan crackers are very clever and efficient for their intended use. However, there is not found amongst these prior art devices a contraption that is as efficient in operation as may be desired, and which separates the intact pecan halves from the debris to provide a preponderance of pecan halves from the pecan nuts.

It is therefore desirable to have made available an improved pecan shucker that is inexpensive to own, easy and economical to operate, which greatly enhances the removal of all of the undesirable inedible material from the pecan nut, and which gains intact pecan halves from the nut. Apparatus that achieves these desirable goals is the subject of this invention, and which is therefore referred to herein as a pecan shucker, because it does shuck the intact pecan halves from the nut.

SUMMARY OF THE INVENTION

This specification sets forth the precise invention for which a patent is solicited, in such manner as to distinguish it from other inventions and from what is old. This invention comprehends both method and apparatus for shucking pecans, and particularly for obtaining pecan halves that are intact and easily freed of the undesirable parts of the pecan, such as the pecan shell and other inedible parts of the pecan.

The present invention provides improvements in a pecan shucker that has attached thereto a reciprocating actuator for moving a pecan along a longitudinally disposed axis. A guide and crusher assembly comprising a plurality of circumferentially arranged radially movable members are arranged about the longitudinally disposed axis and are each provided with a crush and guide means arranged to be radially moved towards one another and into engagement with the outer surface of a pecan nut which may be placed therebetween. The guide and crusher assembly exerts a compressive force on opposed sides of the pecan nut of a magnitude to crush the shell at selected areas thereof, but not to damage the meat halves thereof.

Almost all pecan nuts have a length that is substantially greater than its width, and are oblate in cross-sectional configuration, with the pecan halves or pecan meats being oriented lengthwise. The width of the halves extend along the greater dimension of the nut when viewed from the top, or pointed end thereof. Consequently, it has been discovered that the space between the confronting nut meat halves lies in a predictably located plane that is easily ascertained by visual observation, or by the sense of touch. When the pecan shell is crushed such that it is cracked and weakened in a particular manner, and a blade is thereafter passed lengthwise between the confronting pecan halves, the unobvious result is that the pecan meat halves will almost always emerge undamaged, and easily cleaned of the debris. Therefore homosapiens, or the mechanical equivalent thereof, can advantageously utilize and operate the present invention. Consequently, when the pecan shell is crushed and a blade passed lengthwise between the halves, the pecan meat halves will emerge undamaged and easily separated from the debris.

In the prefered embodiment of this invention, at least one of the radially movable members has a roller means formed thereon which engages and guides the pecan therethrough and at the same time crushes the pecan shell on opposed sides of the nut.

In one embodiment of the invention, the guide and crushing rollers are aligned with respect to a lateral blade member that is passed lengthwise between the halves of a crushed pecan.

In another embodiment of the invention, the guide and crushing rollers are arranged perpendicular with respect to the blade. In a third embodiment of the invention, there are guide and crushing rollers that are arranged ninety degrees apart, with there being opposed guide and crushing rollers aligned with the blade and also arranged perpendicular respective to the blade.

Accordingly the nut is oriented respective to a plurality of crushing and guide rollers, a blade is oriented respective to the nut meats to pass between the confronting nut meats, whereby, a pecan is guided through the apparatus of this invention which selectively crushes the pecan shell and subsequently bisects the nut while concurrently rendering the debris easily removable, whereupon pecan halves are separated from the nut debris.

In operation, a pecan is properly orientated respective to opposed crushing and guide rollers, and respective to a blade, and a plunger pushes the pecan through the guide and crushing rollers, while the laterally positioned blade thereafter passes between the pecan meat halves, whereupon the bisected meat halves drop from the pecan shucker with very little or no damage, and is easily freed of the debris.

Therefore, a primary object of the present invention is the provision of apparatus and method by which pecan halves of a nut are separated from the pecan shells and other unwanted parts of the pecan nut and thereby provides a product that fetches a superior price on the market.

Another object of the invention is to provide an improved pecan shucker that is inexpensive to own, easy and economical to operate, which makes easily removable all of the undesirable inedible material from the pecan nut, and which gains intact pecan halves from the nut.

A further object of this invention is to disclose and provide a pecan shucker having a guide and crusher assembly that provides a plurality of biased roller assemblies, arranged in opposition to one another, and forming a passageway therethrough, through which the pecans are forced to travel; and, wherein the pecans exiting the biased roller assemblies have been crushed and disassembled in a manner such that the pecan halves are retrieved in excellent condition for final separation of the meat halves from the debris.

A still further object of this invention is to provide a method of removing intact pecan halves from pecan nuts by forming a variable passageway having a longitudinally extending axis along which pecans are forced to travel. A plurality of circumferentially arranged radially movable members form a guide and crusher assembly for crushing pecans, with the radially movable members being arranged for radial movement respective to the passageway. A lateral blade means for bisecting the resultant crushed pecans underlies the guide and crusher assembly. A pecan is first crushed by the guide and crusher assembly, and thereafter the crushed pecan is bisected by the blade, which shucks the intact pecan meats from the debris.

These and various other objects and advantages of the present invention will become readily apparent to those skilled in the art upon reading the following detailed description and claims and by referring to the accompanying drawings. The above objects are attained in accordance with the present invention by the provision of a combination of elements which are fabricated in a manner substantially as described herein and illustrated in the drawings.

BRIEF DESCRIPTION OF THE DRAWINGS

FIG. 1 is a perspective, quartering, frontal view of the preferred embodiment of this invention, showing the pecan shucker of this invention in an operative stand-by position;

FIG. 2 is an enlarged, detailed, fragmentary, part cross-sectional view taken along line 2—2 of FIG. 1;

FIG. 3 is a fragmentary, top plan view of FIG. 2;

FIGS. 4 and 5 are isolated, enlarged, perspective views of part of the apparatus of FIGS. 2 and 3;

FIGS. 6 and 7 are isolated, cross-sectional views taken along lines 5—5 and 6—6, respectively, of FIGS. 4 and 5, respectively;

FIG. 8 is an enlarged, fragmentary, isolated, elevational view of part of the apparatus of FIGS. 1—3;

FIG. 13 is a lateral cross-sectional view of a pecan nut being forced through the pecan shucker of this invention.

DETAILED DESCRIPTION OF THE PREFERRED EMBODIMENT

The accompanying drawing illustrates schematically, and as an example, the preferred embodiment of the pecan shucker according to this invention. In FIG. 1, the arrows at numeral 10 broadly indicate the pecan shucker according to the present invention. A combination pecan guide and crusher assembly 12 is supported from the top surface 15 of a relatively large, heavy, self-supporting base 14. The base 14 is a commercially available, hollow, sectioned length of 4 inch×4 inch square in cross-section steel member.

Figures 9, 10:
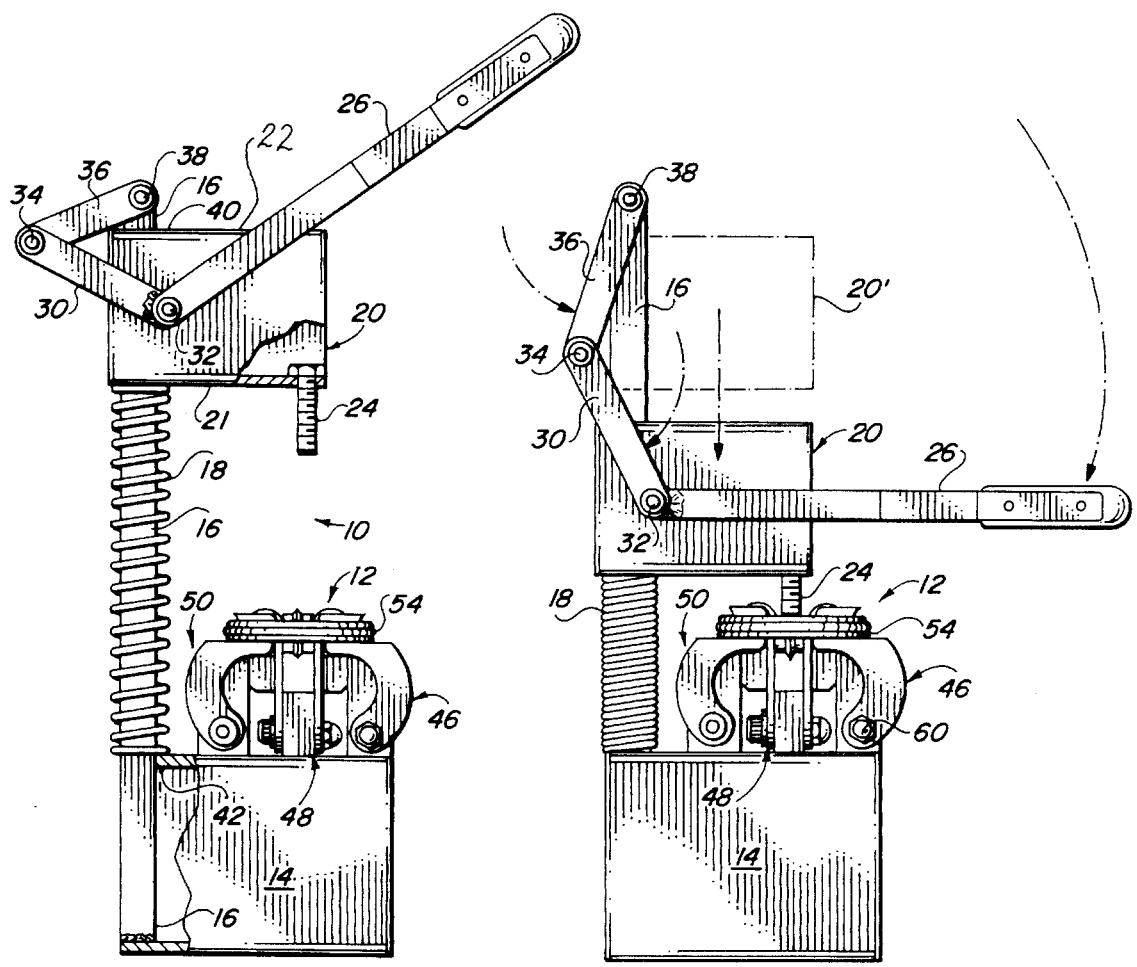
FIG. 9 is a reduced, side elevational view of FIG. 1, showing the pecan shucker of this invention in the standby configuration and ready to shuck a pecan.
FIG. 10 is a side elevational view of FIGS. 1 and 9, illustrating the pecan shucker of this invention in the alternate configuration after having shucked a pecan.
Figures 11, 12:
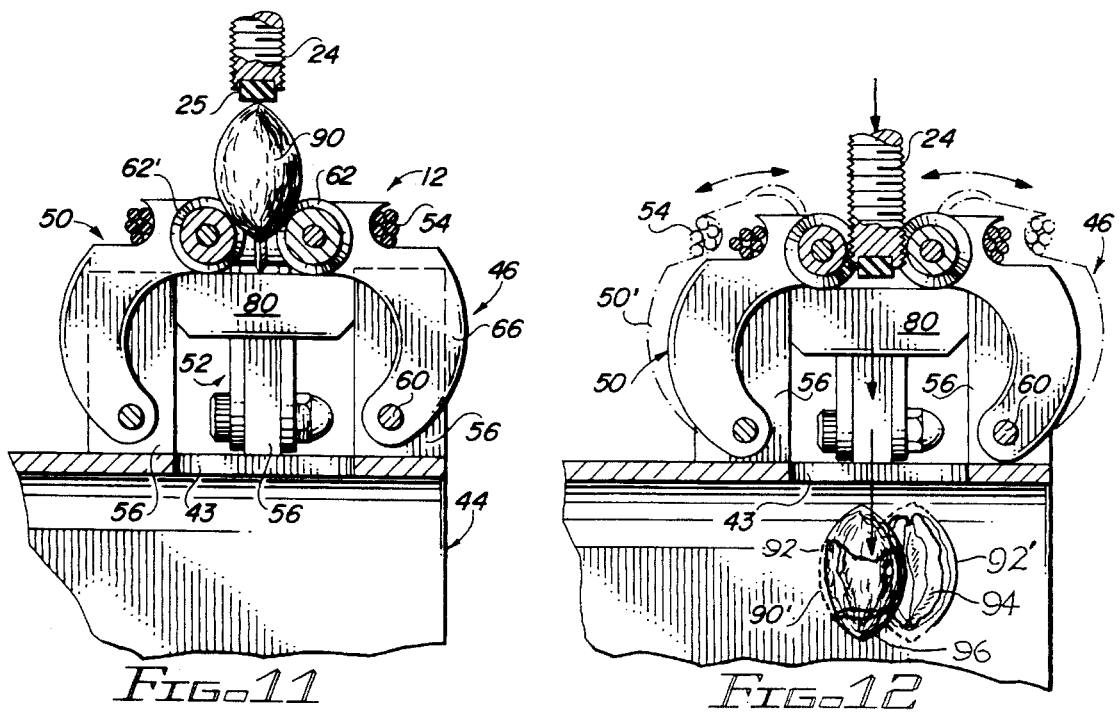
FIG. 11 is an enlarged, fragmented, isolated, side elevational, detailed view of FIG. 9, showing important parts of the pecan shucker of this invention in standby configuration ready to shuck a pecan.
FIG. 12 is an enlarged, fragmented, isolated, side elevational, detailed view of FIG. 10, showing important parts of the pecan shucker of this invention in the alternate configuration after having shucked a pecan.

In FIGS. 1, 9 and 10, a vertical support 16, also square in cross-section and preferably ⅝ inches×⅝ inches in dimension, is fabricated from a commercially available, sectioned length of a steel member.

A return spring 18 is preferably coiled about support 16 and provides a spring force of approximately 11 pounds when partially collapsed, which provides the reciprocating traveling head 20 with a satisfactory response rate when in use. The traveling head 20 preferably is rectangular in cross-section and 1-½ inches×3 inches×4 inches in dimension, and is fabricated from a commercially available, hollow, sectioned length of a steel member.

The head 20 has opposed bottom and top faces 21 and 22, with there being a pecan pusher 24 attached to and downwardly depending from the lower face 21 thereof, to provide a means by which any number of pecans can be sequentially forced to travel along the illustrated longitudinally extending axial center 25 of the guide and crusher assembly 12. The pecan pusher 24 is reciprocatingly moved along axis 25 by actuation of the operating lever 26, as will be more fully explained later on herein.

The main operating lever 26 has a handle 28 at the free or far end thereof. A first interconnecting linkage 30 is rigidly attached to the pivoted end 32 of the attached lever 26 and linkage 30, and therefore move in unison. Hence connected lever 26 and linkage 30 are rigidly connected at the attached ends thereof, and are jointly pivotally connected to the head 20 by means of a through bolt that forms a pivot at 32.

The first interconnecting linkage 30 is attached to a hinge 34. One end of the illustrated second interconnecting linkage 36 is also connected to the hinge 34. The other end of the linkage 36 is pivotally connected at 38 to the upper end of the vertical support member 16. This novel configuration of the operating linkage requires an unexpected small application of force at the handle 28 in order to actuate the apparatus throughout its cycle of operation, which is one reciprocation in a downward direction, followed by a return reciprocation in an upward direction. The invention 10 will operate in most any position and it should therefore be understood that the terms up, down, and the like, are relative terms for purposes of illustration and should not be considered to be limiting.

An aperture 40, illustrated in the form of a square vertical tunnel, extends diametrically through the opposed faces 21 and 22 of the traveling head member 20 within which member 16 is reciprocatingly received. An opening 42 (see FIG. 9) is formed into upper surface 15 of base 14 through which the lower marginal end of member 16 is received, and preferably is rigidly attached to the lower face thereof. This provides a rigid structure of more than adequate strength for surviving the rugged use that can be sustained by the pecan shucker 10.

As best seen illustrated in FIGS. 1–3, 11 and 12, a second opening 43 is formed along the axial centerline 25 and extends downwardly through the center of the guide and crusher assembly 12 for receiving and expelling shucked pecans therefrom. Numeral 44 indicates the hollow interior of the base 14 within which shucked pecans, along with the resultant debris, are caught therewithin.

As seen in various Figures of the drawings, the guide and crusher assembly 12 includes a plurality of biased radially movable members, one of which is seen illustrated by the numeral 46, arranged adjacent the entrance to the hollow interior 44, and mounted in facing relationship respective to one other of the biased roller assemblies, of which there are preferably a total of four.

In the preferred embodiment of this invention, there are four radially movable members 46, 48, 50 and 52, best seen illustrated in FIGS. 2 and 3, together with FIGS. 1 and 9–12 of the drawings. As particularly illustrated in FIG. 3, the radially movable members 46 and 50 are identical in construction and arranged diametrically opposed to one another, while the remaining two radially movable members 48 and 52 are likewise identical to one another and diametrically opposed. Hence, members 46–52 are spaced at 90 degree intervals about the axis 25.

Biasing means 54, shown herein as a plurality of rubber bands for purpose of illustration, are received in the illustrated recess 55 (see FIG. 2) for concurrently forcing each of the radially movable members 46, 48, 50 and 52 to move radially towards the common vertical axis 25.

Mount blocks 56 are circumferentially disposed about the opening 43, and are individually attached to the upper surface 15 of the base 14, and equally spaced 90 degrees apart and arranged about the vertical axis 25. Curved members 58 (see FIG. 1) of each of the radially movable members 46, 48, 50 and 52 are provided with a lower pivot 60 which preferably is a shoulder bolt that extends through each of the curved members 58, with the mounting block 56 being positioned therebetween.

It will be noted in FIGS. 1–3 and 9–12 that each of the radially movable members 46, 48, 50 and 52 are identical in construction, save the roller located at the upper extremity thereof. Therefore, there is an opposed crushing guide roller, 62 or 62', for each of the radially movable members 46 and 50; and, an adjacent opposed crushing alignment roller 64 or 64' for each of the radially movable members 48 and 52. The curved members 58 include a pair of confronting curved plate members, best seen at 66, 66' in FIG. 3, for each of the radially movable members 46, 48, 50 and 52. The plate members 66, 66' are connected by spacer 68 which is placed between each of the illustrated adjacent curved plate members 66, 66', to provide a strong, boxed construction that resists torsional deformation during operation thereof. The spacer 68 abuttingly engages the outer wall of the mount blocks 56 and thereby forms a stop member for limiting inward radial travel of the radially movable members 46, 48, 50 and 52, yet leaving ample room for the passage of a pecan therethrough.

In FIGS. 1 and 3, a variable passageway 70 (see FIG. 3) is formed along the vertical axis 25 (FIG. 1) through which pecans are forced to travel when engaged and pushed therethrough by pecan pusher 24.

FIGS. 4–7 illustrate the details of the crushing guide and crushing alignment rollers 62, 62', 64 and 64'. The crushing guide rollers 62, 62' have spaced, circular, blade-like teeth 72, 72' that form a recessed groove 74 therebetween. In FIG. 5, the crushing alignment rollers 64, 64' have opposed circumferentially arranged teeth 76, and include spaced shoulders 78 formed on opposed sides thereof. The circular guide and crush teeth slightly cut into the outer surface of the pecan shell to resist forwards or backwards slippage along the (blade member 80) as well as to prevent rotation thereof about axis 25 as the pecan is forced to move along the axial passageway. The crushing guide rollers 62, 62' are best used for the dual purpose of crushing and guiding the pecan while the crushing alignment rollers 64, 64' are best used for crushing the pecans at a location 90 degrees from the crushing guide rollers and maintaining proper alignment of the pecan during the crushing process.

A blade member 80 for bisecting crushed pecans is provided with a sharp laterally arranged leading edge 82. The opposed blade marginal ends 84 and 86 are anchored within slots formed within the opposed mount blocks 56. Each of the rollers 62, 64 are pivoted at 88 (FIG. 2) to the respective curved member 58 for suitably mounting the crush and guide rollers at the upper extremity thereof. A pecan 90, (FIG. 1) after having passed through the crush and guide rollers at 90', is bisected at 92, 92' (FIG. 12) during the shucking operation of the pecan and thereby provides unusually cleaned and intact pecan meats (shelled halves) 94 along with debris 96.

FIGS. 9–13 illustrate the various manipulative steps involved in operating the pecan shucker. Specifically, in operation, a pecan 90 is properly oriented respective to the four rollers and the pecan meats thereof to receive the bisecting blade longitudinally within the space between the pecan meat halves, and arranged so that the pecan pusher forces the pecan through the guide and crushing assembly to thereby crush the pecan shell at six places described following. It is important to crush the pecan where there are natural formed cavities or wrinkles in the pecan meat halves so the crushed shell does not damage the meat halves. Hence, the pecan shell is crushed at two places opposite each other at 90 degrees from the bisecting blade path by wheels 64, 64'. Also, at two places opposite each other, each of which produce two crush places 30 degrees on each side of the bisecting blade path by wheels 62, 62' (see FIG. 13). It is especially important to apply a crushing force with the crush/guide rollers 62 62' as crushing the pecan shell along these four paths releases the meat halves to come free from the debris undamagaed and wholly intact. The spring force at biasing means 54 can easily be regulated by tiral and error by adding and removing rubber bands of various strength (or any other materials with elastic qualities), whereby, the pecan shell is deformed sufficiently to cause the proper amount of crushing, but the crushing must not be too excessivse or otherwise the pecan meat may sustain injury.

The bisecting blade is aligned with respect to the crushing rollers at a location to be introduced into the intervening space between the pecan meat halves so that the meat halves drop from the pecan shucker undamaged. The blade bisects the pecan nut along the intervening space found between the confronting pecan halves and thereby separates the two pecan meat halves. The remaining debris is then easily flaked off as a result of the biased crushing bisecting process.

The method of this invention is practiced by orienting pecans respective to the bisecting blade member, which in turn is oriented respective to the rollers of the crush and guide means, and using the pecan pusher 24 to force the pecan nut to move through the crush and guide assembly, thereby crushing the outer shell of the guided pecan such that subsequent engagement with a laterally arranged bisecting blade member separates the pecan halves from one another as well as greatly loosening and frequently separating the halves from the unwanted residue of the pecan nut.

Pecans differ in shape and size, and the shells thereof exhibit different physical characteristics. Accordingly, some pecans are easily processed using only the two opposed assemblies at 46 and 50. Other pecan structure may require only the two opposed assemblies at 48 and 52. Further, the rollers 62, 62' can sometime be substituted for the rollers 64, 64', and vice versa.

Furthermore, those skilled in the art, having digested this disclosure, will now realize that pecans can be shucked using only three of the assemblies (46–52), when the assemblies are spaced 120 degrees apart, and thereby advantageously practice this invention using various arrangements of the rollers.

The configuration of the rollers 62, 64 can be changed to accommodate various configurations of pecans. The preferred configuration of the rollers is seen in FIG. 13 of the drawings.

It should be noted in FIG. 10 that the hinge 34 is a link bolt that abuts the support 16 to limit the downward travel of the pecan pusher 24 and thereby avoids contact with the blade 80.

I claim:

1. A pecan shucker for pecans having an outer shell and inner meat having a base (15), from which there is supported a pecan guide and crusher assembly (12), said pecan guide and crusher assembly having an axial passageway (25) formed therethrough for crushing pecans (90) as said pecans move through said passageway;

a pecan pusher means (24) for effecting relative movement between the pecan and said pecan guide and crusher assembly, to move a pecan along said axial passageway and through said crusher assembly; whereby, pecans are sequentially forced to travel axially through said guide and crusher assembly, and, blade means (80) oriented to engage and bisect a crushed pecan as the pecan is traversing said guide and crusher assembly, to thereby shuck pecan meat halves from the shell of a crushed pecan.

2. The pecan shucker of claim 1 wherein said guide and crusher assembly includes a plurality of radial movable members (48), a crushing and guide means (62, 64) attached to each of said radial movable members, and biasing means (54) for urging said plurality of radial movable members radially towards one another to thereby engage and crush the outer shell of a pecan prior to shucking the meat halves therefrom.

3. The Pecan Shucker of claim 2 wherein there is further included means mounting a traveling head (20) for reciprocation respective to said base (15), said pecan pusher (24) is attached to said head (20) and positioned to travel along the axial passage in response to reciprocation of said head.

4. The pecan shucker of claim 3 wherein there is further included a main operating lever having a handle with a free end and having an opposed end being pivotally attached to said traveling head; a first interconnecting linkage (30) having opposed ends (32, 34), one opposed end is rigidly attached to the pivoted end of said main operating lever and pivots therewith, and has a free end depending therefrom; an interconnecting lever having one end hingedly connected to the free end of said first interconnecting linkage with the other end thereof being pivotally connected to said vertical support member, whereby;

a downward force exerted on said handle forces said traveling head to reciprocate in aligned relationship respective to said vertical support member and thereby reciprocate said pecan pusher means.

5. A Pecan Shucker according to claim 3 wherein said base is hollow and includes an outwardly directed opening; said traveling head having an aperture forming a vertical tunnel diametrically therethrough within which a vertical support member is reciprocatingly received;

there being a second opening formed in said base and along an axial centerline of said guide and crusher assembly for receiving the shucked pecans therethrough; said second opening extends into said hollow base;

said guide and crusher assembly includes a plurality of radially movable members having crush and guide means thereon that are arranged opposed to one another, while the other pair of crush and guide means are likewise arranged opposed to one another;

said first pair of crush and guide means being arranged for receiving a pecan and oriented such that the confronting meat halves thereof are aligned to receive said blade therebetween and travel lengthwise therethrough;

said crush and guide means being oriented respective to two pecan to travel along the opposed longitudinal edges thereof to crush the pecan and thereby facilitate shucking the debris from the pecan as said blade means passes therethrough.

6. The pecan shucker of claim 1 wherein said guide and crusher assembly includes a plurality of radially movable members arranged in opposition to one another, means by which said radially movable members are radially biased to move towards said axial passageway into engagement with the outer surface of a pecan;

and, said blade means includes a laterally arranged edge portion that is oriented respective to the radially movable members to engage and bisect a crushed pecan as the pecan is being crushed while traversing said guide and crusher assembly and thereby shuck the pecan meat halves from the debris thereof.

7. The pecan Shucker of claim 6 wherein there is further included means pivotally attaching each of said radially movable members to said base; said blade is aligned with and supported in underlying relationship respective to two opposed radially movable members; whereby a major axis of a pecan is aligned with said blade to cause blade to pass between the confronting pecan halves and thereby shuck the pecan meat halves from the debris thereof.

8. A pecan shucker as recited in claim 1 wherein said pecan guide and crusher assembly includes a plurality of radially movable members, mount means circumferentially spaced about the passageway to which said plurality of radially movable members are mounted for movement, a biasing means for concurrently forcing each of the radially movable members towards the axial passageway;

there is a first and a second pair of diametrically opposed radially movable members; said blade means being arranged respective to said first and second pair of opposed radially movable members for bisecting crushed pecans; and further including rollers (62, 64) pivotally mounted (88) to the respective opposed radial movble members (58), and oriented respective to a pecan to travel along opposed longitudinal edges thereof to crush the pecan and thereby facilitate shucking the shell from the pecan as said blade means passes therethrough.

9. A pecan shucker for pecans having an outer shell and inner meat (10) having means forming a guide and crushing assembly (12) comprising a plurality of radially movable members, a pecan pusher means, a variable passageway defined by said movable members (25) formed along an axis of said crushing assembly through which pecans are forced by said pecan pusher means to travel;

said radially movable members are circumferentially arranged about said passageway, and having a central axis that coincides with said variable passageway; said radially movable members each have a crush and guide means (62, 64) mounted thereon for engaging and guiding and crushing a pecan that is forced to move along the passageway;

a blade means (80) mounted adjacent to said guide and crushing assembly (12) for bisecting crushed pecans; whereupon the pecan nuts sequentially move through the guide and crusher assembly (12) to thereby crush the guided pecan such that subsequent engagement with said blade means separates the pecan meat halves from one another as well as separating the halves from the unwanted shell of the pecan nut.

10. The pecan shucker of claim 9 wherein said crushing and guide means (62) is attached to each of said radial movable members, and biasing means (54) for urging said plurality of radial movable members radially towards one another to thereby engage and crush the outer shell of a pecan prior to shucking the meat halves therefrom; whereby, the nut is oriented respective to the crushing and guide means, and the blade is oriented respective to the nut meats to pass between the confronting nut meats, whereby, a pecan nut is guided through the crushing and guide assembly which selectively crushes the pecan shell and subsequently bisects the nut while concurrently removing some of the shell therefrom, whereupon pecan halves are subsequently easily separated from the remaining nut debris.

11. The pecan shucker of claim 10 wherein there is further included a base, means mounting a traveling head (20) for reciprocation respective to said base (15), said pecan pusher (24) is attached to said head (20) and positioned to travel along the axial passage in response to reciprocation of said head.

12. The pecan shucker of claim 9 wherein said radial movable members of said guide and crushing assembly are aligned with respect to said blade means and with respect to a pecan that may pass through said passageway; whereby the pecan shell is engaged at an outside surface of the shell at a location adjacent an intervening space between confronting pecan halves to crush the pecan shell at said location, and then the pecan is forced against the blade means which enters the intervening space of the pecan halves and thereby separates the pecan halves from the cracked shell.

13. The pecan shucker of claim 12 wherein said blade is arranged perpendicular with respect to one opposed pair of said radially movable members and parallel with respect to another opposed pair of said radially movable members to thereby enter between the pecan halves and bisect the crushed pecans.

14. The pecan shucker of claim 12 wherein each radially movable member has a guide and crushing roller mounted thereon; said blade is arranged in underlying relationship and perpendicular to the longitudinally extending central axis of a pair of opposed crushing rollers; and with the blade being perpendicular respective to the pair of opposed crushing rollers.

15. The pecan shucker of claim 12 wherein said radially movable members include guide and crushing rollers and said blade is arranged perpendicular with respect to one pair of opposed guide and crushing rollers, and there are guide and crushing rollers that are aligned with the blade and also arranged whereby when the pecan shell is crushed and the blade is passed between the halves of the crushed pecans, the pecan meat halves will emerge undamaged and subsequently easily freed of debris.

16. The pecan shucker of claim 12 wherein said radially movable members each include a roller assembly thereon, means by which said roller assemblies are radially biased to move towards said axial passageway into engagement with the outer surface of a pecan;

and, said blade means includes a laterally arranged edge portion that is oriented respective to the roller assemblies to engage and bisect a pecan as the pecan is being crushed while traversing said guide and crusher assembly, and thereby facilitate shucking the pecan meat halves from the debris thereof.

17. A method of shucking pecans for pecans having an outer shell and inner meat halves comprising the steps of:

orienting a pecan nut with respect to a blade means such that an intervening space located between the confronting halves of the pecan nut defines a plane within which the blade means lays;

arranging a plurality of radially biased pecan crushing means about a longitudinally extending axis;

arranging said blade member laterally of said longitudinally extending axis;

crushing said pecan by moving said pecan along said longitudinal axis and through said plurality of radially biased pecan crushing means; and then into engagement with said blade means, whereupon said blade means passes lengthwise between the pecan meat halves of the crushed pecan nut, thereby obtaining undamaged pecan meat halves that easily are freed of shell debris.

18. The method of claim 17 and further including the steps of:

circumferentially arranging a plurality of crush and guide means for radial movement towards said axis;

biasing said crush and guide means radially towards one another and into engagement with an outer surface of a pecan nut that may be located therebetween; whereby the crush and guide means engages and guides a pecan through said guide and crusher assembly while concurrently exerting a compressive force on the pecan shell of a magnitude to crush the shell along opposed sides thereof adjacent the edges of the pecan meat halves.

19. The method of claim 17 and further including the steps of:

aligning said guide and crush means with respect to said blade means and with respect said pecan whereby the outer shell of the pecan is engaged at the outer surface thereof at a location adjacent the intervening space between the confronting pecan halves to crush the pecan shell at said location, and guide the pecan past said blade means, which enters the intervening space between the pecan meats and separates the cracked pecan.

20. The method of claim 17 and further providing guide and crushing means with guide and crushing rollers and including the steps of arranging said blade means perpendicular with respect to one pair of said opposed guide and crushing rollers;

aligning said guide and crushing rollers with the blade means, whereby after the pecan shell is crushed; the blade means is passed between the halves of the crushed pecans, and the pecan meat halves emerge undamaged and easily freed of debris.

* * * * *